United States Patent [19]

Lauritzen et al.

[11] Patent Number: 5,626,360

[45] Date of Patent: May 6, 1997

[54] LINEAR IGNITERS FOR AIRBAG INFLATORS

[75] Inventors: Donald R. Lauritzen, Hyrum; David J. Green, Brigham City; Robert D. Taylor, Hyrum; Scott C. Mitson, Honeyville, all of Utah

[73] Assignee: Morton International, Inc., Chicago, Ill.

[21] Appl. No.: 392,578

[22] Filed: Feb. 23, 1995

Related U.S. Application Data

[63] Continuation-in-part of Ser. No. 213,176, Mar. 14, 1994, Pat. No. 5,441,705.

[51] Int. Cl.$^6$ ............................................. B60R 21/28
[52] U.S. Cl. ............................... 280/741; 422/166
[58] Field of Search ........................ 200/728.1, 729, 200/730.1, 731, 732, 736, 741; 102/350, 351; 422/164, 165, 166, 167

[56] References Cited

U.S. PATENT DOCUMENTS

| | | | |
|---|---|---|---|
| 3,062,147 | 11/1962 | Davis et al. | 102/70 |
| 3,069,844 | 12/1962 | Bearer | 60/35.6 |
| 3,828,676 | 8/1974 | Junker | 102/39 |
| 4,005,876 | 2/1977 | Jorgensen et al. | 280/741 |
| 4,133,707 | 1/1979 | Andrew | 149/28 |
| 4,200,615 | 4/1980 | Hamilton et al. | 422/166 |
| 4,278,638 | 7/1981 | Nilsson et al. | 280/736 |
| 4,358,998 | 11/1982 | Schneiter et al. | 102/530 |
| 4,561,675 | 12/1985 | Adams et al. | 280/734 |
| 4,846,368 | 7/1989 | Goetz | 280/736 |
| 4,865,635 | 9/1989 | Cuevas | 55/276 |
| 4,878,690 | 11/1989 | Cunningham | 280/741 |
| 4,919,897 | 4/1990 | Bender et al. | 422/305 |
| 4,922,823 | 5/1990 | Rahnenfibrer et al. | 102/288 |
| 4,923,212 | 5/1990 | Cuevas | 280/736 |
| 5,078,422 | 1/1992 | Hamilton et al. | 280/736 |
| 5,259,643 | 11/1993 | Kraft et al. | 280/740 |
| 5,308,370 | 5/1994 | Kraft et al | 280/740 |
| 5,407,226 | 4/1995 | Lauritzen et al. | 280/728 R |
| 5,407,227 | 4/1995 | Lauritzen et al. | 280/728 R |

FOREIGN PATENT DOCUMENTS

| | | | |
|---|---|---|---|
| 3932576 | 4/1991 | Germany | C06D 5/00 |
| 4317727 | 5/1991 | Germany | B60R 21/26 |
| 2268714 | 1/1994 | United Kingdom | B60R 21/20 |

OTHER PUBLICATIONS

Combustible Ordnance in the United States; Brochure of Cirton Armtec; Publication Date Unknown; pp. 1–14.

Combustible Ignition Tubes–Howitzer; 1 page Flyer of Criton Armtec; Publication Date Unknown.

Material Data Safety Sheet; Air Bag; Publication of Ford Motor Co.; May 21, 1993; pp 1–6.

*Primary Examiner*—Kenneth R. Rice
*Attorney, Agent, or Firm*—Henry W. Tarring, II; Gerald K. White

[57] ABSTRACT

Igniters for use in airbag inflators are disclosed. The igniters are fabricated of consumable materials which produce essentially no solid by-products. The igniters, or parts thereof, can be formed by molding or extrusion processes. The invention also provides a consumable auto-ignition cap as part of one of the embodiments of the igniter assembly.

35 Claims, 4 Drawing Sheets

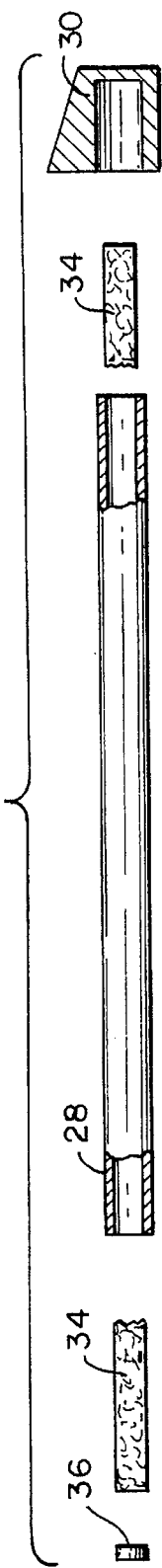
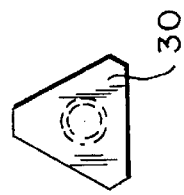
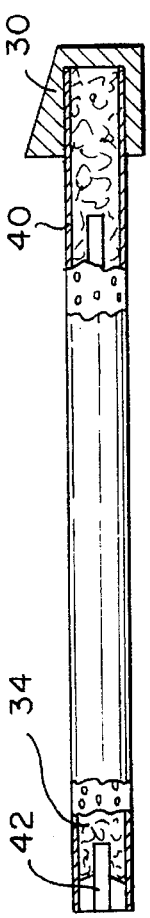

LINEAR IGNITERS FOR AIRBAG INFLATORS

This application is a Continuation-in-Part of application Ser. No. 08/213,176, filed on Mar. 14, 1994, now U.S. Pat. No. 5,441,705, issued on Aug. 15, 1995 to Donald R. Lauritzen, David J. Green and Larry D. Rose, entitled "Combined Reaction Can and Inflator with Extruded Generant" and assigned to the assignee of the present application.

BACKGROUND OF THE INVENTION

1. Field of the Invention

This invention relates to inflatable passive restraint systems used in vehicles for restraining the movement of a seated occupant during a collision and, more particularly, to improved igniters for the activation of the gas generator, or inflator, of such a system.

2. Description of Related Art

Safety restraint systems which self-actuate from an undeployed state to a deployed state without the need for intervention by the operator, i.e. "passive restraint systems", and particularly those restraint systems incorporating inflatable bags or cushions (commonly referred to as "airbags") have been devised for automotive vehicles. In such systems, one or more airbags are stowed in storage areas within the passenger compartment of the vehicle. Upon actuation, the airbag is deployed from its storage area into the passenger compartment through openings in the vehicle interior.

Vehicular inflatable restraint systems normally include at least one crash sensor, generally positioned about the frame and/or body of the subject vehicle, which serves to sense sudden decelerations by the vehicle. Upon detection of such a sudden deceleration, as would occur in a collision, the airbag or airbags are rapidly inflated and deployed to cushion the driver and/or passengers from injury-causing contact with the interior structure of the vehicle.

An airbag provided for the protection of the vehicle driver, i.e. a driver side airbag, is usually mounted in a storage compartment located in the steering column of the vehicle. An airbag for the protection of a front seat passenger, i.e., a passenger side airbag, is typically mounted in a storage compartment behind the instrument panel/dashboard of the vehicle. Such airbags are housed in a deflated, folded condition to minimize space requirements. Mounted in close conjunction with the airbags are the necessary elements to cause inflation thereof upon actuation by the sensor. A number of devices are known for the inflation of airbags. In one device, known as an inert gas inflator, a folded airbag is inflated by gas supplied from a container charged with a pressurized supply of inert gas. In another known device, referred to as a pyrotechnic inflator, gas is generated by ignition of a pyrogenic gas generating composition, the components of which either decompose or chemically react to generate sufficient gas to inflate one or more airbags in the required time period. A third type of device, known as a hybrid inflator, uses both a stored gas supply and a pyrogenic gas generating composition. In those devices using gas generating compositions, an igniter is required to initiate the generation of the inflation gas. Igniters may take a number of forms dependent on the specific gas generation device and the particular gas generant composition utilized.

One form of igniter is described in U.S. Pat. No. 4,005,876, of Jorgensen et al., issued Feb. 1, 1977. In the device described in this patent, the igniter includes a steel tube filled with a pyrotechnic material, an electric squib at one end of the tube, and a long fuse extending the length of the tube. The tube contains an igniter composition comprising a granular mixture of boron and potassium nitrate. Pellets of a gas generating composition, such as sodium azide, surround the steel tube. The electric squib initiates combustion of the fuse, igniting the igniter composition which releases a flame of hot gases on the gas generant pellets.

Hamilton, in U.S. Pat. No. 4,200,615 issued Apr. 29, 1980, teaches a similar linear igniter.

A further device is taught in Cunningham, U.S. Pat. No. 4,878,690, issued Nov. 7, 1989. The igniter in this device comprises a relatively thin perforated aluminum or stainless steel tube. Rapid deflagration cord (RDC) is provided in the center of the tube with granules of an ignition composition surrounding it. The tube is covered with an adhesive backed aluminum foil to keep the ignition powder or granules from coming through the holes in the perforated steel tube. Foam plugs are press fit into the ends of the tube. In inflators which use wafers of the gas generant, the ignition tube is located in the center hole of the wafers, while in inflators which use particles or pellets of gas generant material, the igniter is centered in the combustion chamber and surrounded by the pellets. In such devices, ignition begins at the center of the tube and the ignition products flow through the perforations in the tube to the pyrogenic gas generant, heating it to a temperature at which it generates inflation gas. The initially generated inflation gas passes through the particles, pellets or wafers of gas generant to exit the combustion chamber through perforations provided in its exterior wall.

These prior art inflators all provide for passing the gas through a filter as they leave the combustion chamber and before they are discharged in the airbag. The filter serves both as a heat sink, cooling the gases, and to remove particulates from the gas stream. Such particulates can result from degradation of the gas generant wafers or pellets caused, at least in part, by the flow of the initially generated gas through the as yet unconsumed gas generant particles as such gas passes to the perforations in the exterior wall of the combustion chamber. Further particulates can also result from the partial deterioration of structural components used within the combustion chamber, the igniter and the squib initiator. The filters used in the prior art inflators effectively assure that such particulates do not exit into the airbag.

The prior art igniters, whether used with gas generant pellets or with gas generant wafers, are assembled to be centered in the inflator combustion chamber. Moreover, to be effective, the igniters must provide for an even ignition throughout the length of the inflator. To accomplish such they often use a rapid deflagration cord (RDC) fuse, having a flame propagation rate in the range of 660 to 1200 feet/second, surrounded by a binary ignition material, a mixture of finely divided boron and potassium nitrate, which provides a suitably high temperature impingement of ignition gases on the gas generant for an effective dwell time. Many variations of the prior art inflators and their linear igniters are presently in use and work well. However, the igniters are comprised of many components, some of which are costly, and require labor intensive assembly.

The igniters of the prior art are relatively expensive to make and install. Additionally, they can produce a hot particulate residue which must be removed to prevent its damaging the airbag during the inflation thereof. A need exists for less complicated, more easily assembled igniters which provide uniform ignition, while providing a high degree of safety and consistency.

Further, in many prior art inflators, specifically those made of aluminum, the possibility that they may be subjected to a high temperature environment, such as might be encountered in a vehicle fire, leads to a further safety concern. The gas generant in the inflator typically will auto ignite (ignite in the absence of actuation by the igniter) at a temperature of about 650° F. (343° C.). At such a temperature the strength of the aluminum housing degrades resulting in the possibility of it rupturing and scattering fragments in all directions. Since the use of relatively light weight aluminum in the housing offers weight advantages, the provision of an igniter which will auto-ignite, at a temperature at which the physical strength and integrity of an aluminum housing is not compromised, is desirable. Auto-ignition devices have been provided in prior art aluminum inflators, see U.S. Pat. No. 4,561,675, to Adams et al. and assigned to the assignee of this application. However, the provision of such auto-ignition means has required the assembly of the several components involved therein and their mounting in the inflator. A need exists for a simplified auto-ignition device with fewer components which can be assembled easily and less expensively.

DESCRIPTION OF THE INVENTION

SUMMARY OF THE INVENTION

The present invention is directed to a novel igniter for passive restraint systems which may be easily and economically manufactured while avoiding the deficiencies of the previously discussed igniters.

One object of the present invention is to provide an igniter which can be manufactured more simply and less expensively than prior art igniters.

Another object is to provide an igniter from components which are consumed when ignited, thereby reducing the filtration requirements of the prior art inflators.

A further object is the provision of solid igniters the shape of which can be tailored to complement the particular grain configuration of the gas generant.

A further object is the provision of an igniter having the characteristics noted above and which incorporates therein a stable and reliable auto ignition material which consistently provides for auto ignition at a temperature below that at which the strength and structural integrity of the aluminum shell is compromised and which is relatively simple to manufacture and install.

BRIEF DESCRIPTION OF THE DRAWINGS

Reference is made to the accompanying drawings in the detailed description which follows. In these drawings like parts are designated by the same reference numbers.

FIG. 2 is an exploded view of the igniter shown in the inflator of FIG. 1.

FIGS. 3A and 3B show a further preferred embodiment of the invention wherein the main body of the igniter is an extruded or molded shape of igniter material. FIG. 3B is an end view of the igniter shown in FIG. 3A.

FIGS. 4A and 4B show another embodiment of an igniter according to this invention.

FIG. 5B is a cross section of the inflator located at the break in FIG. 5A.

FIG. 6B is a cross section of the inflator located at the break in FIG. 6A.

FIG. 7B is a cross section of the inflator located at the break in FIG. 7A.

FIG. 8A is a side view, while FIG. 8B is an end view, of the igniter.

DETAILED DESCRIPTION OF THE INVENTION

In accord with the present invention, a new igniter is provided wherein the metallic components of the previously used igniters are replaced by components fabricated from materials which are consumable, being essentially converted to by-products which are gases at the temperatures produced during the gas generation process. The new igniter provides ignition material encased in a solid consumable tube either (a) by fabricating a hollow tube of the consumable material and loading the tube with the igniter material or (b) by fabricating a solid rod of the igniter material. The solid rod embodiment may include one or more perforations which run longitudinally through the solid rod and which provide a path for flame propagation. In the hollow tube embodiment an end cap is provided at one end of the tube to hold the igniter material within the tube. Such an end cap can be fabricated from a composition, such as a nitrocellulose composition, which functions as a source of auto-ignition at a temperature below that at which the strength of the aluminum inflator housing significantly deteriorates.

The inventive igniters can be used as substitutes for the igniters in the prior art inflators described above or they can be used with an extruded gas generant such as that described in commonly assigned application Ser. No. 08/392,570, filed by the same inventors on the same day as this application, entitled "Gas Generation and Ignition System for Airbag Inflation", and which is incorporated by reference herein.

Figure 1:
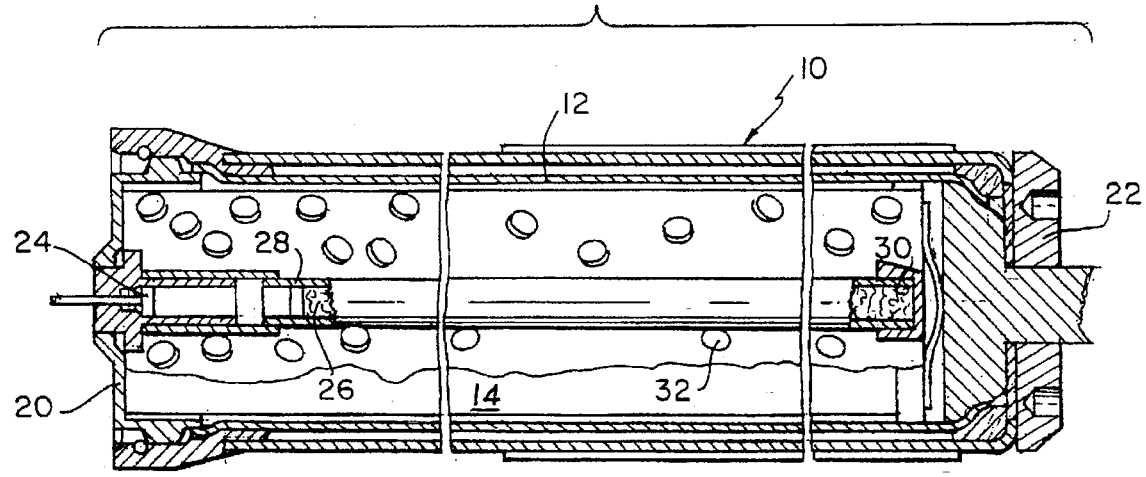
FIG. 1 is a cross-section schematic view of an inflator assembly incorporating an igniter according to the present invention.

A centrally ignited inflator for use with a passenger side airbag assembly, and in which the inventive igniters can advantageously be used, is shown in FIG. 1. In this embodiment, the inflator includes an elongated housing 12 enclosing a combustion chamber 14. The combustion chamber 14 is further defined by a first end cap 20 and a second end closure 22 respectively. A standard squib 24, or other suitable initiator, as generally known in the art, is located at one end of the gas generator 10, in proximity with igniter 26. The igniter 26 includes an igniter tube 28 fabricated from a consumable material. Cap 30, provided at one end of the igniter, is formed from a nitrocellulose composition which is formulated to provide an auto-ignition temperature of between 300° and 450° F., preferably between 350° and 400° F. Igniter 26 is located generally in the axial center of the gas generator 10, and is supported there by the end cap 20 and end closure 22. Gas generant material surrounds the igniter. Such gas generant material is shown in the form of pellets 32, but could be provided in the form of a series of flat washer-like shaped wafers.

The igniter shown in FIG. 1 is shown in exploded form in FIG. 2. The igniter comprises a consumable tube or shell 28 which is filled with igniter material 34, whereby the igniter material is effectively shaped by the tube or shell in which it is confined. As used herein, the term "consumable" is meant to define a material which, when subjected to ignition and deflagration, leaves no solid residue and produces essentially no hot solid particulates. One end of the tube 28 is plugged with a consumable retainer 36 to prevent the ignition fibers or granules from falling out of the tube. The retainer is preferably made of nitrocellulose or another completely consumable organic material, such as paper. The other end of the tube 28 is enclosed by end cap 30 which comprises the auto-ignition material. The igniter material 34 may be any of a number of compositions which meet the recognized requirements for producing rapid ignition and non-toxic ignition products. Such igniter material can be provided in the form of small granules, fibers, rolled sheet material or as a unitary shaped solid. The use of a finely divided mixture of 25 weight % boron and 75 weight % potassium nitrate ($BKNO_3$) is conventional and is suitable in the present igniter. Preferably, in each igniter configuration, the igniter material is selected to provide a flame propagation rate of at least 600 feet per second. Most preferably, a flame propagation rate of 1000 to 1200 feet per second is provided.

Most preferably, the igniter is formed from an extruded composition which forms a unitary solid rod of igniter material as is shown in FIGS. 3A and 3B. The solid rod 38 could also be formed by molding a suitable composition, such as nitrocellulose with a suitable solvent and, optionally, a reinforcing fiber and/or a binder. In this application the term molding is used in the broad sense and is meant to encompass any of the techniques for forming solid shaped solids in a form defined by forming and/or shaping the solid in a mold. As such, it is inclusive of casting and dry pressing processes. The solid rod is particularly suitable for forming igniter shapes which are tailored to correspond and complement the configuration of the gas generant. In this case, the assembly of the igniter is greatly simplified inasmuch as the solid rod may be used as extruded and cut to an appropriate length, or it may be joined with a nitrocellulose auto-ignition cap 30 either by press-fitting or with the aid of a bonding agent. In the latter case, the fabrication of the gas generating assembly is further simplified since it is not necessary to provide an auto-ignition sub-assembly. The solid rod form of the igniter may contain one or more perforations, preferably in the longitudinal direction, to facilitate ignition initiation by encouraging flame propagation through the perforations. Accordingly, the term solid rod should be understood to refer to the fact that the solid materials which make up the igniter are provided as a unitary body, and the term does not mean that such rod is void-free.

The nitrocellulose auto-ignition cap 30 formed to fit over the end of an elongated tube or rod containing igniter material is a novel aspect of the present invention which is also applicable to prior art igniters. Prior art gas generators have included auto-ignition means as a sub-assembly located adjacent, but set apart from, the igniter tube sub-assembly. In such prior art gas generators, the end of the metal igniter tube adjacent the auto-ignition means is closed by a screen which retains the igniter material granules in the tube, while providing a path for the flame from the auto-ignition means to pass into the tube to contact and ignite the igniter material granules. In assembling these prior art gas generators particular attention needs be given the proper location and alignment of the auto-ignition and igniter tube sub-assemblies to assure that ignition of the auto-ignition means will properly activate and ignite the ignition material in the metal igniter tube. The nitrocellulose based auto-ignition cap 30 can be assembled on igniter tubes as used in prior art gas generators thereby eliminating the need for both the separate auto-ignition means and the screen closure with its associated mounting means. Such simplifies the assembly of such a gas generator while eliminating the possibility of misalignment of the two sub-assemblies occurring during fabrication.

FIGS. 4A and 4B illustrate an igniter 26 comprising a metal igniter tube 40 which contains a rapid deflagration cord (RDC) 42 surrounded by igniter material 34, all of which is well known in prior art igniters. The igniter of FIG. 4 is improved over the prior art igniters in its incorporation therein of a nitrocellulose based auto-ignition cap 30 as used in the embodiments of FIGS. 1 and 3. Accordingly, the nitro-cellulose based auto-ignition cap is a novel and unobvious element of the fully consumable igniters described herein which can also be advantageously used with prior art igniters which are otherwise not fully consumable.

It is generally recognized that the materials used in the gas generator are selected and formulated so that they do not produce toxic by-products, since occupants of the vehicle will be subjected to such by-products. Since incomplete combustion of organic materials can result in the production of carbon monoxide, a toxic gas, sufficient oxidants are usually provided in the gas generator to assure essentially complete combustion to non-toxic carbon dioxide.

The fully consumable igniter tube is preferably produced from a nitrocellulose based composition, in which case the nitrocellulose additionally functions as at least part of the igniter material. However, it is not necessary that the consumable igniter tube also function as igniter material, any fully consumable organic material of sufficient stiffness which does not produce toxic by-products may be used. Materials such as paper and appropriate plastics, such as poly(hydrocarbons) and poly(hydrocarbon oxides) are suitable, provided sufficient oxidants are also provided, either in the tube or elsewhere within the gas generator, to provide for essentially complete combustion to carbon dioxide. The tube shape can be produced by conventional forming methods such as by extrusion, or by rolling a sheet of the material into tube form and stabilizing it in such form by the use of a suitable heat treatment or with the use of binders.

The nitrocellulose based auto-ignition end cap 30 is prepared from nitrocellulose and a suitable amount of a stabilizer, such as diphenylamine or ethyl centralite, to result in a composition having the desired auto-ignition temperature in the range of 300° to 450° F. and, preferably, in the range of 350° to 400° F. Decreasing the amount of stabilizer provides lower auto-ignition temperatures. Accordingly, an appropriate amount of stabilizer to accomplish the desired auto-ignition temperature could be a lesser amount, such as up to 2% by weight, than the up to 4% amount that is commonly used in nitrocellulose compositions. The composition need not be uniform throughout the end cap, but may provide lower concentrations of stabilizer at particular surfaces wherein the varied concentration is particularly effective in achieving the desired auto-ignition, such as those regions which are most effectively thermally coupled with the inflator exterior by an intervening region of high thermal conductivity.

The igniter material, as indicated previously, can be any of the recognized igniter materials, such as a finely divided mixture of boron and potassium nitrate. In an embodiment involving a fully consumable ignition tube which is made of a material having a slow or effectively non-existent flame propagation rate, the use of a suitable fusing material, such as a length of RDC cord, in combination with the igniter material, will assure a satisfactory rate of ignition. The use of a solid rod of a mixture of nitrocellulose with 1 to 4% stabilizer as the igniter is the preferred embodiment inasmuch as it greatly simplifies the fabrication of the igniter and provides a more readily achieved, consistent product. The rod is preferably produced by an extrusion process, however, it can be produced by molding or by rolling and setting a sheet of the nitrocellulose composition into a rod shaped form. Virtually any of the known igniter compositions can be extruded provided it possess appropriate plasticity at the temperatures and pressures used in the extrusion process. Such plasticity can result either from the melting of one or more components, from the ability of one or more components to plastically deform at the extrusion conditions, or from the addition of a solvent or suspending medium (such as water) which can be volatilized from the finished extruded product. For instance, the conventional mixture of 25% finely divided boron and 75% potassium nitrate can be provided as an extrudable mixture by mixing with methanol and water, with the possible addition of a binder, such as bentonite, and/or reinforcing fibers, such as graphite or fiberglass fibers. While the extruded product is a unitary solid, in its dried or cured form it will contain some degree of porosity resulting in a variable degree of effective surface area. The greater the amount of effective surface area, the faster will be the ignition or flame propagation rate of the igniter.

The gas generant 32 can be any of the materials which meet the recognized requirements of suitable burning rate, non-toxicity and flame temperature. Suitable compositions are described in U.S. Pat. No. 4,203,787 to Kirchoff et al. and U.S. Pat. No. 4,369,079 to Shaw, which patents are incorporated herein by reference.

Figure 5A:
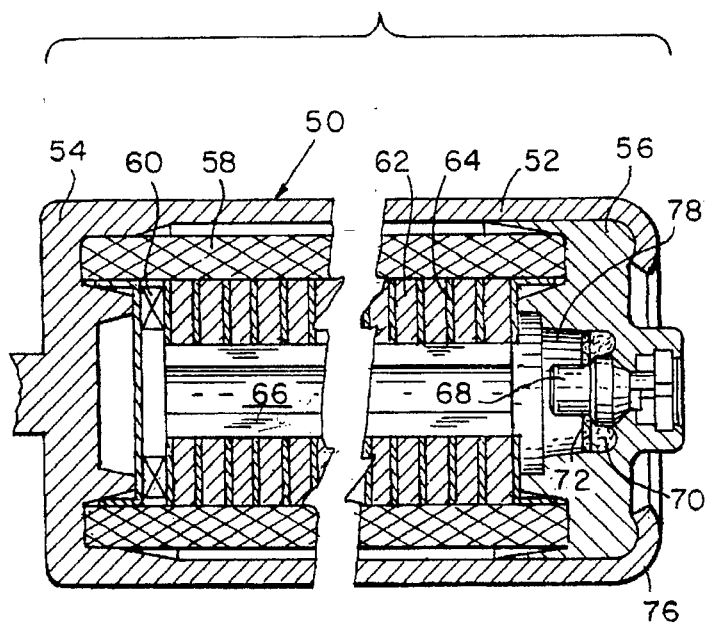
FIGS. 5A and 5B show another inflator in which an igniter according to the present invention can advantageously be used.
Figure 5B:
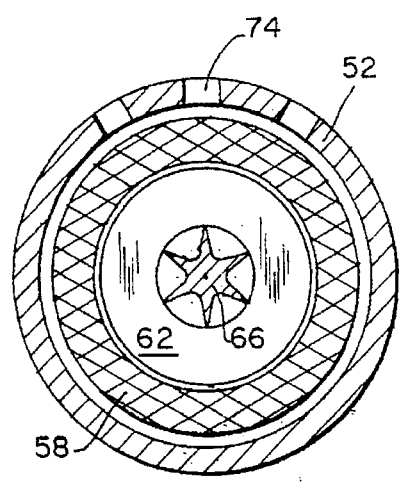

FIGS. 5A and 5B illustrate an airbag inflator which uses an igniter according to the present invention with gas generant washer-like wafers which are centrally, or internally, ignited. The inflator 50 includes elongated housing 52 which includes a first end 54. At the other end of the housing 52, a second end base 56 is provided to effectively enclose the igniter contents. The housing 52 contains a filter pack 58 having a generant preload assembly 60 adjoining the first end 54. The preload assembly provides a degree of compressive resiliency to physically stabilize the gas generant material against attrition caused by vibration, thermal expansion or shocks as might be encountered if the assembly is accidently dropped. The washer-shaped gas generant wafers 62 and screen spacers 64 are alternately stacked from the first end 54 to the second end base 56 inside of the filter pack 58. Located within the central opening of the stacked washer-like wafers is an igniter 66 in accord with the present invention. The igniter shown in this embodiment is produced as an extrusion having a six pointed star cross-section. The second end base 56 retains an initiator, such as a standard squib 68, and an auto-ignition charge 70, formed of a material, such as a sensitized nitrocellulose composition, selected to auto-ignite at a temperature of 300° to 450° F., preferably between 350° and 400° F. The auto-ignition charge 70 is retained in second end base 56 by an overlying screen retainer 72. Perforations, or porting holes 74, in appropriate locations in the elongated housing 52, allow the generated gas to exit the inflator to the interior of a conventional airbag (not shown). The inflator is assembled by loading the above described components in the elongated housing 52 and then swaging the second end of the housing 52 over the second end base 56 resulting in a swage stake 76 securing the end base 56 and all of the loaded components in place. Optionally, the cavity 78 may be loaded with a booster charge and closed with an aluminum foil or plastic disc.

Figure 6A:
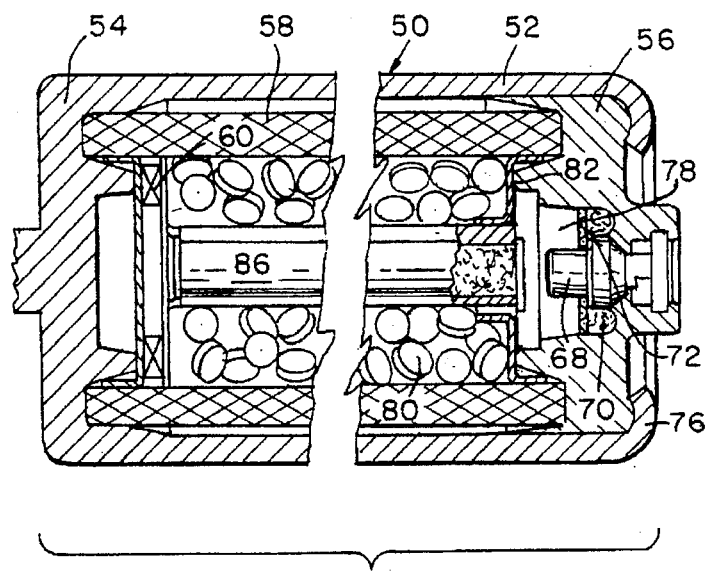
FIGS. 6A and 6B show a further inflator using an igniter according to the present invention.
Figure 6B:
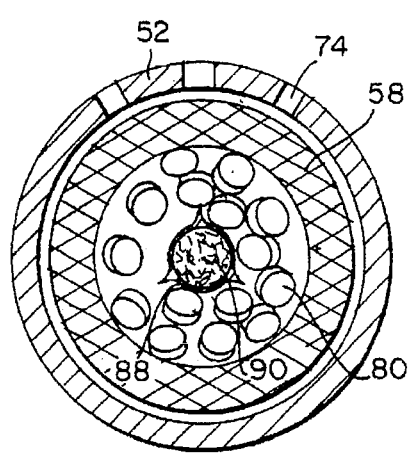

A further inflator embodiment using an igniter according to the present invention as shown in FIGS. 6A and 6B, wherein like items are designated by the same reference numbers as used in FIGS. 5A and 5B. This inflator is similar to the inflator shown in FIGS. 5A and 5B, however it provides the gas generant as pellets 80 and provides an end closure 82 which more securely holds the igniter in a central location within the combustion chamber. Moreover, the igniter 86 in this embodiment comprises a hollow extruded tube of nitrocellulose 88 which is loaded with an igniter material 90, such as a nitrocellulose composition or a mixture of finely divided boron and potassium nitrate.

Figure 7A:
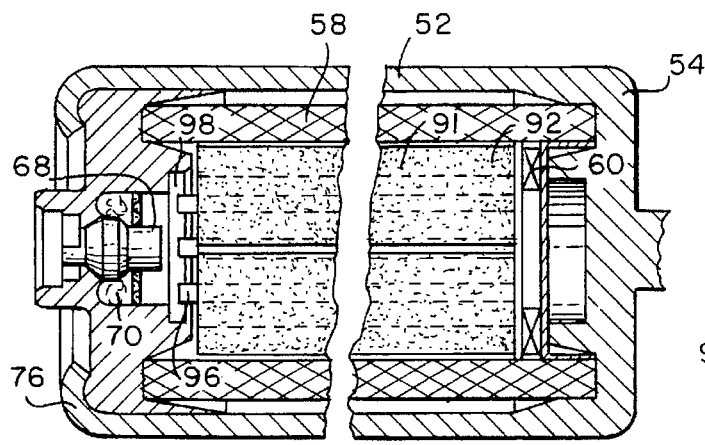
FIGS. 7A and 7B show a further inflator using igniters according to the present invention.
Figure 7B:
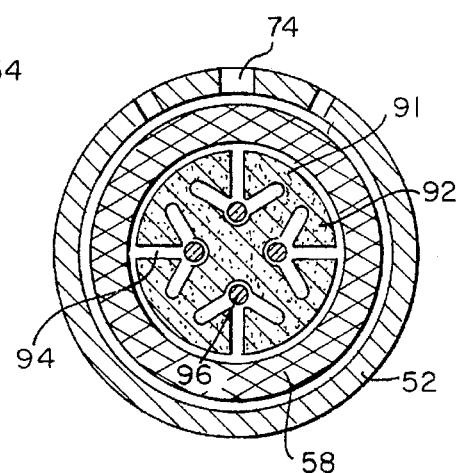

A particularly preferred inflator using the inventive igniter is described in the previously referred to copending application Ser. No. 08/392,570, entitled "Gas Generation and Ignition System for Airbag Inflation". An example of such an igniter, using an extruded gas generant and providing for gas generation to proceed generally from the external surface to the interior is shown in FIGS. 7A and 7B, wherein like items are designated by the same item numbers as used in FIGS. 5A and 5B. This inflator provides the gas generant 91 as at least one molded or extruded solid block 92 having grooves 94 extending into the block from its external surface, and suitable for retaining linear, preferably extruded, igniter strips 96. In the embodiment of the Figure, four igniters are provided in four primary grooves. The igniter strips preferably extend past one end of the gas generant solid block into the initiation chamber 98 wherein they are contacted by initiation gases produced either from activation of the squib 68 or from activation of the auto-ignition charge 70. The configuration of the grooves 94 can be designed to provide desired gas generation characteristics and to assist in retaining the igniters therein during the assembly process. The cross-sectional shape of the molded or extruded linear igniter strips can also be designed to cooperate with the shape of the grooves provided in the gas generant solid blocks 92. It should be noted that in this, as well as the other embodiments, the igniter usually does not fully occupy the cavity or housing provided for it. Typically, sufficient open space is provided between the igniter and its cavity or housing to permit flames produced by the squib or the first ignited portions of the igniter to spread along the length of the igniter, thereby accomplishing virtually instantaneous ignition along the entire length of the igniter.

Figure 8A:
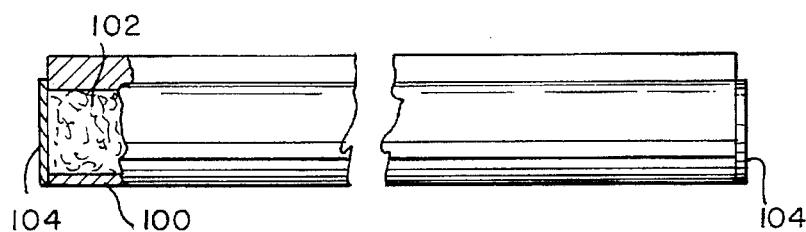
FIGS. 8A and 8B illustrate a further igniter according to the present invention.
Figure 8B:
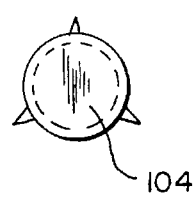
Figure 9A:
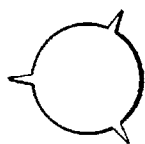
FIGS. 9A through 9I illustrate various cross sections of igniters according to the present invention.
Figure 9B:
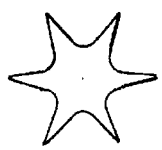
Figure 9C:
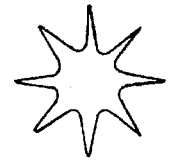
Figure 9D:
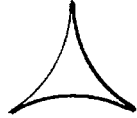
Figure 9E:
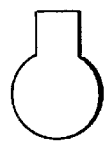
Figure 9F:
Figure 9G:
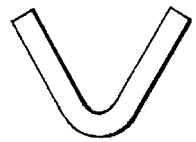
Figure 9H:
Figure 9I:
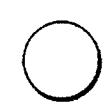

FIGS. 8A and 8B illustrate a linear igniter comprising a hollow, preferably extruded, tube 100 loaded with granules of igniter material 102 and closed by consumable end plugs 104.

FIGS. 9A through 9I show various advantageous cross-sections of solid, preferably extruded, igniters according to the present invention. The configurations shown in FIGS. 9A through 9D are particularly suitable for use in centrally ignited inflators, such as those depicted in FIGS. 1, 5 and 6. The configurations shown in FIGS. 9E through 9I are particularly suitable for use in externally ignited inflators (i.e. those which ignite from the outside with the ignition progressing inwardly) such as the inflator depicted in FIG. 7.

Figure 10:
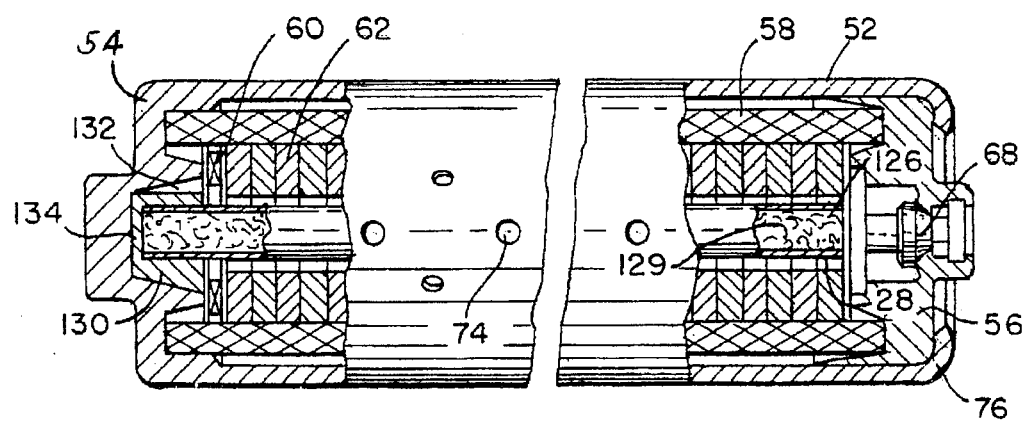
FIG. 10 shows a further inflator wherein an auto-ignition cap in accord with the present invention cooperates with a cavity in the inflator housing to centrally locate the igniter within the housing.

The generally triangular cross-section of the auto-ignition cap (as best seen in FIGS. 3B and 4B) can be coordinated with a cavity in the adjacent combustion chamber end structure to provide for self-centering of the igniter as it is assembled within the cavity. The efficiency of such an auto-igniter cap is enhanced by locating it adjacent an inflator component, such as an aluminum combustion chamber end structure, which provides good heat conductivity between the auto-igniter cap and the exterior of the inflator. The inflator of FIG. 10 is similar to the inflator depicted in FIG. 5, and uses similar item numbers to designate similar components. The inflator of FIG. 10, however, incorporates a tubular igniter 126 packed with ignition material 129 and having an auto-ignition cap 130 which fits centrally within a female cavity 132 in the first end 54. The female cavity 132 is shaped to position the triangular shape of the auto-ignition cap so that the igniter is located along the axis of the cylindrical inflator housing 52. Moreover, it is shaped to permit the end of the auto-ignition cap 130 to fit flush against the interior surface of the aluminum housing at the bottom 134 of cavity 132, thereby assuring good heat conductivity between the exterior of the inflator housing and the auto-ignition cap.

In accord with the invention an improved igniter which is economical and relatively convenient to produce and install in a gas generator is provided. The improved igniter provides for improved inflation of automotive airbags by avoiding the production of hot particulate residue in the generated gas while also providing for a simplified and less expensive manufacturing process. Moreover, the embodiments which do not use rapid deflagration cord (RDC) provide diminished toxicity in the generated gas due to elimination of the lead present in the RDC.

It should be understood that this description of the invention is subject to modification and adaptation by those skilled in the art and that such modifications and adaptations shall be considered to be within the scope of the present invention, as set forth in the following claims.

We claim:

1. An igniter for use in a vehicle airbag assembly comprising an igniter material which is maintained in its intended functional shape by a solid body of a consumable material which is essentially consumed to a non-solid phase upon ignition of the igniter material.

2. An igniter as defined in claim 1 wherein the shape of said solid body of consumable material comprises a hollow cylinder.

3. An igniter as defined in claim 2 wherein said igniter material comprises a particulate material confined within said hollow cylinder.

4. An igniter as defined in claim 1 wherein at least a portion of said solid body of consumable material is formed from a material having an auto ignition temperature in the range of 300° to 450° F.

5. An igniter as defined in claim 4 wherein at least part of said consumable material is nitrocellulose.

6. An igniter as defined in claim 2 wherein a deflagration cord is part of said ignition material.

7. An igniter as defined in claim 1 wherein said solid body of consumable material is provided as an integral solid rod, and wherein said igniter material is selected to provide an igniter with a flame propagation rate of at least 600 feet per second.

8. An igniter assembly for an automotive airbag comprising an igniter shell which encompasses igniter material, wherein said shell is made of a solid material which is consumed producing essentially no solid by-products during ignition of the igniter.

9. An igniter assembly as defined in claim 8 wherein said igniter shell is in the shape of a hollow tube.

10. An igniter assembly as defined in claim 9 wherein said igniter material is particulate.

11. An igniter assembly as defined in claim 8 wherein said igniter shell and said encompassed igniter material are integrally formed from the same material.

12. An igniter assembly as defined in claim 11 wherein said igniter shell and said igniter material are integrally formed by an extrusion process.

13. An igniter assembly as defined in claim 11 wherein said igniter shell and said igniter material are integrally formed by a molding process.

14. An igniter assembly as defined in claim 11 wherein said igniter material comprises material selected from the group consisting of nitrocellulose and a mixture of boron and potassium nitrate.

15. An igniter assembly as defined in claim 8 wherein said solid material is comprised of compositions selected from the group consisting of nitrocellulose, paper, polyhydrocarbons and poly(hydrocarbon oxides).

16. In a gas generator for inflating automotive airbags which includes an igniter material in an igniter tube, a gas generating composition surrounding said tube, and means to initiate ignition of said igniter material, the improvement which comprises providing said igniter tube from an organic composition which is consumable producing essentially no solid by-products during said ignition.

17. In a gas generator as defined in claim 16, providing said igniter tube as a linear igniter tube produced by extruding said organic composition.

18. In a gas generator as defined in claim 16, providing said igniter tube as a linear igniter tube produced by molding said organic composition.

19. A gas generator as defined in claim 16, wherein said igniter tube comprises a nitrocellulose composition.

20. A gas generator as defined in claim 16, wherein a consumable cap comprising an organic material which will auto-ignite at a temperature in the range of 300° to 450° F. encloses one end of said igniter tube.

21. A gas generator as defined in claim 16, wherein said igniter tube is formed from a mixture of igniter material and a binder.

22. A gas generator as defined in claim 16, wherein said igniter tube comprises a solid rod formed by extrusion of said igniter material.

23. A gas generator as defined in claim 22, wherein said igniter material comprises nitrocellulose.

24. An igniter assembly for a vehicle airbag restraint system comprising:
   (a) a shell of a solid material,
   (b) an igniter material effectively shaped by said shell, and
   (c) a cap sealing one end of the shell, said cap being fabricated from a material which has an auto-ignition temperature between 300° and 450° F.

25. The igniter assembly of claim 24 wherein at least one of said shell (a) or said cap (c) is fabricated from a material which is fully consumed producing essentially no solid by-products when the assembly is ignited.

26. The igniter assembly of claim 25, wherein said cap (c) comprises nitrocellulose.

27. The igniter assembly of claim 26, wherein said cap (c) has an auto-ignition temperature of 350° to 400° F.

28. The igniter assembly of claim 24, wherein said shell (a) comprises a material selected from the group consisting of nitrocellulose, paper, polyhydrocarbon and poly (hydrocarbon oxide).

29. The igniter assembly of claim 24, wherein both said shell (a) and said cap (c) are fabricated from materials which are fully consumed when the assembly is ignited.

30. The igniter assembly of claim 24, wherein said shell (a) and said igniter material (b) are fabricated as a unitary body of the same material.

31. The igniter assembly of claim 30, wherein said unitary body is fabricated as a molding.

32. The igniter assembly of claim 30, wherein said unitary body is fabricated as an extrusion.

33. The igniter assembly of claim 24, wherein said vehicle airbag restraint system includes an inflator housing containing the means for generating gas to inflate the airbag and wherein said cap (c) is shaped to cooperate with a complementary mating portion at an end of the inflator housing to hold said one end of the shell in a generally central location of said end of the inflator housing.

34. An igniter as defined in claim 1, having a flame propagation rate of at least 600 feet per second.

35. An igniter as defined in claim 1, having a flame propagation rate of 1000 to 1200 feet per second.

* * * * *